United States Patent Office 3,371,088
Patented Feb. 27, 1968

3,371,088
PROCESS FOR PREPARING 19-NOR-
Δ⁴-3-KETOSTEROIDS
Katsumi Tanabe, Rinji Takasaki, Ryozo Hayashi, Yasuhiro Morisawa, Teruo Hashimoto, and Tadamasa Nakazawa, Tokyo, Japan, assignors to Sankyo Company Limited, Tokyo, Japan
No Drawing. Filed Apr. 26, 1966, Ser. No. 545,306
Claims priority, application Japan, May 8, 1965, 40/26,801; July 19, 1965, 40/43,527
4 Claims. (Cl. 260—239.55)

This invention relates to a process for the preparation of 19-nor-Δ⁴-3-ketosteroids. More particularly, this invention is directed to a novel process for the preparation of 19-nor-Δ⁴-3-ketosteroids.

There have been known a variety of methods for the production of 19-nor-Δ⁴-3-ketosteroids. There are well known, for example, those methods appeared in Chemical & Engineering News (Sept. 10, 1962), pages 64–65; J. Org. Chem. 15, 264 (1950); ibid. 19, 1758 (1954); and Experientia 18, pages 464–466 (1962).

However, there are remained some problems to be improved or overcome, for example, as those concerning with the total yield of the desired steroid or with many and cumbersome steps involved.

Although various attempts have been made in order to find an advantageous process for the production of 19-nor-Δ⁴-3-ketosteroids, a great success has not yet been attained, and, therefore, such a novel and advantageous process has earnestly been desired in the art.

It is, accordingly, an object of this invention to provide a new and commercially available process for the preparation of 19-nor-Δ⁴-3-ketosteroids, which are useful as a medicine or an intermediate for the synthesis of other therapeutically valuable 19-norsteroids.

Other objects of this invention will become apparent from the following detailed description.

Unexpectedly, it has now been discovered by us that the treatment of a specific 3,5-cyclosteroid in which carboxyl group (—COOH) is located at $C_{10}$-position and hydroxy group, an etherified hydroxy group or an esterified hydroxy group at $C_6$-position or in which the said groups at $C_{10}$- and $C_6$-positions together form a 6,19-lactone structure with an alkylsulfoxide gives the desired 19-nor-Δ⁴-3- ketosteroid.

The novel process in accordance with this invention comprises heating a 3,5-cyclosteroid having the partial structure, with which only steroidal rings A and B are concerned, of the formula

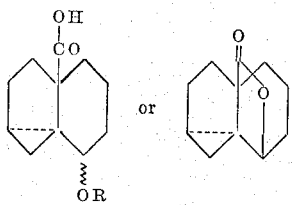

wherein R represents hydrogen, an alkyl group, such as methyl, ethyl, n-propyl, isopropyl and the like or an acyl group, such as acetyl, propionyl, butyryl and the like and the symbol (⋮) denotes either α- or β-configuration with an alkylsulfoxide in the presence or absence of a catalyst to form a 19-nor-Δ⁴-3-ketosteroid having the partial structure, with which only steroidal rings A and B are concerned, of the formula

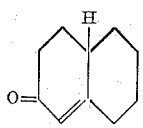

The starting 3,5-cyclosteroid useful in the process outlined above is selected from the group consisting of 3,5-cyclosteroids of the androstane, pregnane, cholane, spirostane and cholestane series; having carboxyl group at $C_{10}$ and hydroxy group, an etherified hydroxy group or an esterified hydroxy group at $C_6$; or having a 6,19-lactone structure. At $C_1$, $C_2$, $C_7$, $C_8$, $C_9$, $C_{11}$, $C_{12}$, $C_{14}$, $C_{15}$, $C_{16}$, $C_{17}$, $C_{18}$, $C_{19}$ and/or $C_{21}$ of the above-specified starting steroids, there may be further present a keto group (=O), a ketalized oxo group, an enolated oxo group, hydroxy group, an etherified hydroxy group, an esterified hydroxy group, an alkyl group, an alkenyl group, an alkynyl group, a halogenoalkynyl group, a halogen atom or a carboxyl group.

There may be more further other groups in the molecule of the starting steroid which do not interfere with the reaction, such as a double bond between $C_9$ and $C_{11}$ or $C_{16}$ and $C_{17}$; oxido group

and the like.

Representative examples of starting steroids are given as follows. However, in the process of this invention, there may be employed other starting steroids; provided that they will fall in the scope of the foregoing specific 3,5-cyclosteroids.

(A) *3,5-cyclosteroids of the androstane series*

6α(or 6β)-hydroxy-3α,5-cyclo-19-nor-5α-androstan-17-one-10β-carboxylic acid and the 17-ketal derivatives thereof and the corresponding 6β(or 6α)-esterified or etherified hydroxy derivatives, for example, the corresponding 6β(or 6α)-acetoxy, -propionyloxy, -methoxy, -ethoxy and -propoxy derivatives; 6α(or 6β), 17β-dihydroxy-3α,5-cyclo-19-nor-5α-androstane-10β-carboxylic acid and the esters and ethers thereof, for example, the corresponding diacetate, diphenylpropionate, 6β-methoxy 17-acetate, 6β-methoxy 17-phenylpropionate derivatives; the 17α-alkyl, -alkenyl, -alkynyl and -halogenoalkyl derivatives of 6α(or 6β), 17β-dihydroxy-3α,5-cyclo-19-nor-5α-androstane-10β-carboxylic acid and the esters and ethers thereof, for example, the corresponding 17α-methyl, -vinyl, -ethynyl, -chloroethynyl and -propynyl derivatives and the corresponding 6β(or 6α)-methoxy 17α-ethyl, 6β( or 6α)-methoxy 17α-vinyl, 6β(or 6α)-methoxy 17α-ethynyl and 6β(or 6α)-methoxy 17α-chloroethynyl derivatives.

(B) *3,5-cyclosteroids of the pregnane series*

6β(or 6α),20-dihydroxy-3α,5-cyclo-19 - nor - 5α - pregnane-10β-carboxylic acid and the esters and ethers thereof, for example, the corresponding 6β(or 6a)-methoxy and -acetoxy derivatives; 6β(or 6α), 17β-dihydroxy-19-nor-5α-pregnan-20-one-10β-carboxylic acid and the esters and ethers thereof, for example, the corresponding 6β(or 6α)-methoxy and 6β(or 6α)-acetoxy derivatives;

(C) *3,5-cyclosteroids of the cholestane series*

6β(or 6α)-hydroxy-3α,5-cyclo-19-nor - 5α - cholestane-10β-carboxylic acid and the esters and ethers thereof, for example, the corresponding 6β(or 6α)-methoxy and -acetoxy derivatives;

(D) *3,5-cyclosteroids of the cholane series*

6β(or 6α)-hydroxy-3α,5-cyclo-19-nor-5α-cholane - 10β-carboxylic acid and the esters and ethers thereof, for example, the corresponding 6β(or 6α)-methoxy and -acetoxy derivatives;

(E) *3,5-cyclosteroids of the spirostane series*

6β(or 6α)-hydroxy-3α,5-cyclo-19 - nor - 5α - spirostane-10β-carboxylic acid and the esters and ethers thereof, for example, the corresponding 6β(or 6α)-methoxy and -acetoxy derivatives;

(F) *3,5-cyclosteroid 6,19-lactones of the androstane, pregnane, cholane, spirostane and cholestane series*

6β-hydroxy-3α,5-cyclo-19-nor-5α-androstan-17-one-10β-carboxylic acid 6,19 - lactone, 6β,17β - dihydroxy - 3α,5-cyclo-19-nor-5α-androstane-10β-carboxylic acid 6,19-lactone, 6β-hydroxy-3α,5-cyclo-19-nor-5α-pregnan - 20 - one-10β-carboxylic acid 6,19-lactone, 6β-hydroxy-3α,5-cyclo-19-nor-5α-cholestane-10β-carboxylic acid 6,19-lactone, 6β - hydroxy - 3α,5 - cyclo - 19 - nor - 5α - cholane - 10β-carboxylic acid 6,19-lactone, and 6β - hydroxy - 3α,5 - cyclo - 19 - nor - 5α - spirostane-10β-carboxylic acid 6,19-lactone.

In one embodiment of the process in accordance with this invention, the reaction can be carried out by dissolving a starting 3,5-cyclosteroid in an alkylsulfoxide and heating the resulting solution. Representative examples of the alkylsulfoxide to be used in the present process include dimethylsulfoxide, diethylsulfoxide, tetramethylenesulfoxide and the like, and dimethylsulfoxide is most suitable because of its commercial availability. The reaction may also be effected in the presence of a suitable solvent, although the excess alkylsulfoxide may be usually employed as both reagent and solvent. Examples of suitable solvents employed are an inert organic solvent, such as benzene or xylenes. The reaction temperature is not a critical feature of this invention, normally, it is desirable to carry out the reaction at a temperature ranging from about 90° C. to 150° C., preferably at about 100–130° C. The reaction period depends mainly upon the reaction temperature employed and, usually, it is convenient to carry out the reaction for approximately 2–24 hours. The reaction may also be, if required, carried out under an inert atmosphere, for instance, under a nitrogen atmosphere. After completion of the reaction, the reaction product may be recovered from the reaction mixture by a known technique. For instance, the reaction product may be recovered by the removal of the alkylsulfoxide with distillation under a reduced pressure.

In another embodiment of the process in accordance with this invention, the reaction can be advantageously carried out by heating a starting 3,5-cyclosteroid together with an alkylsulfoxide in the presence of a catalyst. Suitable catalysts to be employed in the present process include the following compounds:

A mineral acid, such as hydrochloric acid, sulfuric acid, perchloric acid and the like;

A Lewis acid, such as borontrifluoride etherate, stannic chloride, ferric chloride, zinc chloride, borontrifluoride-mercuric oxide complex, aluminium chloride and the like;

An amine acid addition salt, such as hydrochlorides of trimethylamine, triethylamine and pyridine, benzenesulfonates, p-toluenesulfonates and trifluoroacetates of piperidine, aniline, morpholine, and pyridine, and benzenesulfonate of 1,1,6,6-tetramethyl-4-oxo-piperidine and the like; an organic acid, such as p-toluenesulfonic acid, O-phthalic acid, p-nitrobenzoic acid, cyanoacetic acid, trifluoroacetic acid and the like;

An inorganic halide, such as ammonium chloride and the like; an organic compound which is usually employed as an initiator in a radical reaction, such as organic peroxides, for example, benzoyl peroxide and di-t-butyl peroxide, α,α'-azo-bisisobutyronitrile and the like.

Among the foregoing, mineral acids such as sulfuric acid, organic acids such as trifluoroacetic acid and Lewis acids such as borontrifluoride etherate and stannic chloride are preferable. In general, the reaction may advantageously proceed by employing a catalytic amount of the above-listed catalyst, thereby resulting in the reduction of the reaction time, normally up to several hours. The order for the addition of a starting steroid, an alkylsulfoxide and a catalyst is not specified and these reactants may be introduced into the reaction system in any desired order. The reaction conditions such as reaction temperature and time may be generally those of the embodiment disclosed hereinabove without a catalyst, but the reaction time depends largely upon the catalyst employed. In this case, the reaction product may be similarly recovered by a known technique as disclosed hereinbefore.

The following examples serve to illustrate this invention, but are not construed to limit the scope thereof.

EXAMPLE 1

*Preparation of 17β-hydroxy-19-norandrost-4-en-3-one*

(a) In a 100 ml. three-necked flask there was charged 0.50 g. of 6α,17β-dihydroxy-3α,5-cyclo-19-nor-5α-androstane-10β-carboxylic acid and 40 ml. of dimethylsulfoxide. The flask was heated for 20 hours in an oil bath at 130° C. under a nitrogen stream. Then, the reaction mixture was concentrated under a nitrogen stream and the residue thus obtained was dissolved in 50 ml. of ethyl acetate. The resulting solution was washed with one portion of 50 ml. of a 3% aqueous sodium hydroxide solution and then with two portions of 50 ml. of a saturated aqueous sodium chloride solution and dried over anhydrous sodium sulfate. Evaporation of the ethyl acetate gave an oily substance. The benzene solution of the oily substance was chromatographed over alumina (neutral, 30 g., Woelm grade III). Elution with benzene-ethyl acetate (4:1) yielded 0.159 g. of the desired product. Yield: 37.2%.

Following the same procedure as described above except that one of the catalysts and the reaction temperature and period given in the following Table I–a were employed, there was similarly obtained the desired product. The yields are also shown in the Table I–a.

TABLE I-a

| Catalyst | Reaction temperature (° C.) | Reaction period (h.) | Yield (percent) |
|---|---|---|---|
| Benzoyl peroxide | 130 | 10 | 56.2 |
| Conc. H₂SO₄ | 130 | 4 | 62.0 |
| Dil. H₂SO₄ | 130 | 8 | 63.0 |
| Borontrifluoride etherate | 130 | 16 | 57.6 |
| Conc. H₂SO₄ | 100 | 5 | 57.6 |

(b) The general procedure as described in the above (a) was repeated by employing 0.20 g. of 6β,17β-dihydroxy - 3α,5 - cyclo - 19-nor-5α-androstane-10β-carboxylic acid and 30 ml. of dimethylsulfoxide to yield 0.145 g. of the desired product. Yield: 84%.

Similarly, by employing one of the catalysts and the reaction temperature and period given in the following Table I–b, there was obtained the desired product, in the yield shown in the Table I–b.

TABLE I-b

| Catalyst | Reaction temperature (° C.) | Reaction period (h.) | Yield (percent) |
|---|---|---|---|
| Benzoyl peroxide | 130 | 3.5 | 85.0 |
| Conc. H₂SO₄ | 130 | 3.5 | 77.0 |
| Benzoyl peroxide | 100 | 6.0 | 81.5 |
| Conc. H₂SO₄ | 100 | 3.5 | 76.0 |

EXAMPLE 2

*Preparation of 17β-acetoxy-19-norandrost-4-en-3-one*

(a) To 40 ml. of dimethylsulfoxide was added a mixture of 0.50 g. of 6α,17β-diacetoxy-3α,5-cyclo-19-nor-5α-androstane-10β-carboxylic acid and 0.02 g. of conc. sulfuric acid. The resulting mixture was heated to 130° C. for 20 hours under a nitrogen stream. After completion of the reaction, the reaction mixture was concentrated to dryness under a nitrogen stream, the residue was dissolved in 50 ml. of ethyl acetate, the resulting solution was washed with one portion of 50 ml. of a 3% aqueous sodium solution and then with two portions of 50 ml. of a saturated aqueous sodium chloride solution, and dried over anhydrous sodium sulfate. Evaporation of the ethyl acetate gave an oily substance, which was then chromatographed over alumina (neutral; Woelm grade III; 30 g.) and elution with n-hexane-benzene (1:1) yielded 0.152 g. of the desired product. Yield: 38.8%.

Similarly, the same procedure as described above was repeated by employing 0.30 g. of 6β,17β-diacetoxy-3α,5-cyclo-19-nor-5α-androstane-10β-carboxylic acid instead of 6α,17β-diacetoxy-3α,5-cyclo-19-nor-5α-androstane-10β-carboxylic acid to give 0.124 g. of the desired product. Yield: 53%.

EXAMPLE 3

*Preparation of 17α-ethyl-17β-hydroxy-19-norandrost-4-en-3-one*

The same procedure as described in Example 2(a) was repeated by employing 0.5 g. of a mixture of 6α,17β-dihydroxy-17α-ethyl-3α,5-cyclo-19-nor-5α-androstane-10β-carboxylic acid and 6β,17β-dihydroxy-17α-ethyl-3α,5-cyclo-19-nor-5α-androstane-10β-carboxylic acid (6:4), 40 ml. of dimethylsulfoxide and 0.15 g. of benzoyl peroxide to give 0.196 g. of the desired product. Yield: 42.8%.

EXAMPLE 4

*Preparation of 17α-ethynyl-17β-hydroxy-19-norandrost-4-en-3-one*

To 20 ml. of dimethylsulfoxide was added a mixture of 0.50 g. of 6α,17β-dihydroxy-17α-ethynyl-3α,5-cyclo-19-nor-5α-androstane-10β-carboxylic acid and 0.01 g. of benzoyl peroxide and the resulting mixture was heated for 8 hours under a nitrogen stream. After completion of the remixture was concentrated under a reduced pressure and the residue was recrystallized from benzene-n-hexane (1:1) to give 0.21 g. of the desired product, melting at 203–204° C.

EXAMPLE 5

*Preparation of 19-norandrost-4-ene-3,17-dione*

In a 50 ml. three-necked flask were added 0.20 g. of 6-methoxy-3α,5-cyclo-19-nor-5α-androstan-17-one-10β-carboxylic acid and 0.03 g. of benzoyl peroxide and then 20 ml. of dimethylsulfoxide was added thereto. The flask was placed in a bath maintained at about 120° C. for 13 hours under a nitrogen stream. After completion of the reaction, the reaction mixture was concentrated to dryness under a reduced pressure. The residue was dissolved in ethyl acetate, the resulting solution was washed with a saturated aqueous sodium chloride solution and then dried over anhydrous sodium sulfate. The ethyl acetate was distilled off under a reduced pressure and the residue was chromatographed over alumina (neutral; Woelm grade III; 10 g.). Elution with n-hexane-benzene (1:2) gave 0.143 g. of the desired product, melting at 169–170° C. Yield: 87.2%.

The infrared spectrum of the product was proved to be identical with that of an authentic sample.

EXAMPLE 6

*Preparation of 17α-ethyl-17β-hydroxy-19-norandrost-4-en-3-one*

The same procedure as described in Example 5 was repeated by employing 0.2 g. of 6β-methoxy-17α-ethyl-17β-hydroxy-3α,5-cyclo-19-nor-5α-androstane-10β-carboxylic acid in place of 6β-methoxy-3α,5-cyclo-19-nor-5α-androstan-17-one-10β-carboxylic acid to give 0.148 g. (yield: 80%) of the desired product, melting at 136–137° C.

EXAMPLE 7

*Preparation of 17β-hydroxy-19-norandrost-4-en-3-one (19-nortestosterone)*

In a 50 ml. three-necked flask, 0.5 g. of 6β-methoxy-17β-hydroxy-3α,5-cyclo-19-nor-5α-androstane-10β-carboxylic acid and 0.1 g. of benzoyl peroxide were dissolved in 20 ml. of dimethylsulfoxide. The resulting solution was allowed to stand at 120° C. for 5.5 hours under a nitrogen stream. Thereafter, the dimethylsulfoxide was distilled off under a reduced pressure, the residue was dissolved in ether, the etheral solution was washed with a 3% aqueous sodium bicarbonate solution and then with water, and dried over anhydrous sodium sulfate. The ether was removed by distillation to leave 0.41 g. of an oily substance. The substance was chromatographed over alumina (neutral; Woelm grade III) and elution with benzene followed by recrystallization gave 0.35 g. of the desired product, melting at 121–123° C. The infrared spectrum of the product was proved to be identical with that of an authentic sample.

Following the same procedure as described above except that the catalyst shown in the following Table II in the indicated amount and 70 ml. of dimethylsulfoxide were employed, there was similarly obtained the desired product. The yields are also shown in Table II.

TABLE II

| Catalyst (the amount employed, g.): | Yield percent |
|---|---|
| Piperidine benzenesulfonate (0.05) | 62.4 |
| Piperidine p-toluenesulfonate (0.05) | 64.9 |
| Morpholine benzenesulfonate (0.05) | 65.2 |
| Morpholine p-toluenesulfonate (0.05) | 75.5 |
| p-Toluenesulfonic acid (0.01) | 70 |
| Borontrifluoride etherate (0.01) | 72.6 |
| Stannic chloride (0.05) | 77.5 |
| Borontrifluoride - mercuric oxide complex [1] (0.01) | 72.3 |
| p-Nitrobenzoic acid (0.05) | 69.8 |
| Trifluoroacetic acid (0.01) | 75.6 |
| Cyanoacetic acid (0.03) | 73.7 |

[1] Journal of the American Chemical Society, 64, 223 (1942).

EXAMPLE 8

*Preparation of 17β-hydroxy-19-norandrost-4-en-3-one 17-phenylpropionate*

In 120 ml. of dimethylsulfoxide were dissolved 3.0 g. of 6β-methoxy-17β-hydroxy-3α,5-cyclo-19-nor-5α-androstane-10β-carboxylic acid 17-phenylpropionate and 0.4 g. of benzoyl peroxide. The resulting solution was allowed to stand at 130° C. for 5.5 hours under a nitrogen stream. After completion of the reaction, the dimethylsulfoxide was distilled off under a reduced pressure, the residue was dissolved in ether, washed with a saturated aqueous sodium chloride solution and then dried over anhydrous sodium sulfate. The ether was distilled off to leave 2.7 g. of a semisolid substance, which was then recrystallized from methanol to yield 1.6 g. of the desired product, melting at 93–94° C.

Additionally, the mother liquor from the recrystallization was chromatographed over alumina (neutral; Woelm grade III) to give 0.56 g. of the desired product, melting at 93–95° C. The total yield corresponded to 83% of the theoretical one.

The infrared spectrum of the product was proved to be identical with that of an authentic sample.

EXAMPLE 9

*Preparation of 17β-hydroxy-19-norandrost-4-en-3-one 17-adamantoate*

A solution of 1.00 g. of 6β-methoxy-17β-hydroxy-3α,5-cyclo-19-nor-5α-androstane-10-carboxylic acid 17β-adamantoate and 0.01 g. of trifluoroacetic acid in 70 ml. of dimethylsulfoxide was allowed to stand at 120–125° C. for 3 hours under a nitrogen stream. After completion of the reaction, the dimethylsulfoxide was distilled off under a reduced pressure, the residue was dissolved in ether and then the solution was washed with a 2% aqueous sodium hydroxide solution and water successively, and dried over anhydrous sodium sulfate. Evaporation of the ether gave 0.765 g. of a crystalline substance, which was then chromatographed over alumina (neutral; Woelm grade III) and, after elution with benzene followed by crystallization from ether, there was obtained 0.668 g. of the desired product, melting at 202.5–204.5° C. The infrared spectrum of the product was proved to be identical with that of an authentic sample.

EXAMPLE 10

*Preparation of 17α-ethynyl-17β-hydroxy-19-norandrost-4-en-3-one*

A solution of 0.10 g. of 6β-methoxy-17α-ethynyl-17β-hydroxy-3α,5-cyclo-19-nor-5α-androstane-10β - carboxylic acid and 0.005 g. of benzoyl peroxide in 10 ml. of dimethylsulfoxide was heated for 10 hours in an oil bath at 120° C. under a nitrogen stream. Thereafter, the reaction mixture was concentrated to dryness under a reduced pressure to leave a crystalline substance, which was then recrystallized from ethyl acetate to yield the desired product as granular crystals melting at 199–202° C.

EXAMPLE 11

*Preparation of 19-norandrost-4-ene-3,17-dione*

A solution of 1.00 g. of 6β-hydroxy-3α,5-cyclo-19-nor-5α-androstan-17-one-10β-carboxylic acid 6,19-lactone and 0.05 g. of stannic chloride in 70 ml. of dimethylsulfoxide was allowed to stand at 120° C. for 5 hours under a nitrogen stream. After completion of the reaction, the dimethylsulfoxide was distilled off under a reduced pressure to leave an amorphous substance, which was then recrystallized from benzene-n-hexane (1:1) to yield the desired product, melting at 169–170° C.

What is claimed is:

1. A process for preparing a 19-nor-$\Delta^4$-3-ketosteroid which comprises heating a 3,5-cyclosteroid having the partial structure, with which only steroidal rings A and B are concerned, of the formula

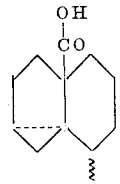

or

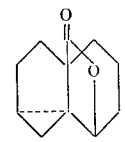

wherein R represents hydrogen, an alkyl group or an acyl group and the symbol "$\xi$" denotes either α- or β-configuration together with an alkylsulfoxide.

2. The process according to claim 1 wherein the reaction is carried out in the presence of a catalyst.

3. The process according to claim 1 wherein the said alkylsulfoxide is dimethylsulfoxide.

4. The process according to claim 2 wherein the said catalyst is a substance selected from the group consisting of borontrifluoride etherate, stannic chloride and trifluoroacetic acid.

References Cited

UNITED STATES PATENTS 3,272,800   9/1966   Tanabe et al.

FOREIGN PATENTS 1,004,298   9/1965   Great Britain.

LEWIS GOTTS, *Primary Examiner.*

M. G. GERGER, *Assistant Examiner.*